US00RE36501E

United States Patent [19]

Hoover et al.

[11] E Patent Number: Re. 36,501

[45] **Reissued Date of Patent: *Jan. 18, 2000**

[54] METHOD FOR PRODUCING INFLATED DUNNAGE

[76] Inventors: Gregory A. Hoover, 700 Scotland St., Dunedin, Fla. 34698; Roger A. Hoover, 2661 Crystal Cir., Dunedin, Fla. 34698; E. Riley Rowe, 519 White Oak Cir., Hartsville, S.C. 29550; David L. Rowe, 11904 E. Appaloosa Run, Raleigh, N.C. 27613

[ * ] Notice: This patent is subject to a terminal disclaimer.

[21] Appl. No.: 09/145,666

[22] Filed: Sep. 2, 1998

Related U.S. Patent Documents

Reissue of:

[64] Patent No.: 5,552,003
Issued: Sep. 3, 1996
Appl. No.: 08/317,760
Filed: Oct. 4, 1994

[51] Int. Cl.[7] ..... B65B 61/00; B63B 25/24

[52] U.S. Cl. ..... 156/147; 156/156; 156/292; 156/308.4; 53/472; 410/119

[58] Field of Search ..... 156/147, 156, 156/198, 292, 308.4; 53/472, 474, 445; 410/119, 125

[56] References Cited

U.S. PATENT DOCUMENTS

| | | | |
|---|---|---|---|
| 3,254,828 | 6/1966 | Lerner . | |
| 3,298,156 | 1/1967 | Lerner . | |
| 3,414,140 | 12/1968 | Feldkamp . | |
| 3,462,027 | 8/1969 | Puckhaber . | |
| 3,477,196 | 11/1969 | Lerner . | |
| 3,523,055 | 8/1970 | Lemelson . | |
| 3,575,757 | 4/1971 | Smith . | |
| 3,575,781 | 4/1971 | Pezely . | |
| 3,577,305 | 5/1971 | Hines et al. . | |
| 3,616,155 | 10/1971 | Chavannes . | |
| 3,650,877 | 3/1972 | Johnson . | |
| 3,730,240 | 5/1973 | Presnick . | |
| 3,808,981 | 5/1974 | Shaw . | |
| 3,817,803 | 6/1974 | Horsley | 156/156 X |
| 3,837,990 | 9/1974 | McConnell et al. . | |
| 3,837,991 | 9/1974 | Evans . | |
| 3,938,298 | 2/1976 | Luhman et al. . | |
| 3,939,995 | 2/1976 | Baxter . | |
| 4,017,351 | 4/1977 | Larson et al. . | |
| 4,040,526 | 8/1977 | Baxter et al. . | |
| 4,044,693 | 8/1977 | Ramsey, Jr. . | |
| 4,076,872 | 2/1978 | Lewicki et al. . | |
| 4,096,306 | 6/1978 | Larson . | |
| 4,102,364 | 7/1978 | Leslie et al. . | |
| 4,103,471 | 8/1978 | Lowdermilk . | |
| 4,146,069 | 3/1979 | Angarola et al. . | |
| 4,201,029 | 5/1980 | Lerner et al. . | |
| 4,314,865 | 2/1982 | Ottaviano . | |
| 4,518,654 | 5/1985 | Eichbauer et al. . | |
| 4,564,407 | 1/1986 | Tsurata | 156/147 |
| 4,576,669 | 3/1986 | Caputo . | |
| 4,597,244 | 7/1986 | Pharo . | |
| 4,619,635 | 10/1986 | Ottaviano . | |
| 4,676,376 | 6/1987 | Keiswetter . | |
| 4,793,123 | 12/1988 | Pharo . | |
| 4,874,093 | 10/1989 | Pharo . | |
| 4,904,092 | 2/1990 | Campbell et al. . | |
| 4,918,904 | 4/1990 | Pharo . | |
| 5,141,494 | 8/1992 | Danforth et al. . | |
| 5,188,691 | 2/1993 | Caputo . | |
| 5,203,761 | 4/1993 | Reichental et al. . | |
| 5,216,868 | 6/1993 | Cooper et al. | 53/472 X |

*Primary Examiner*—Sam Chuan Yao

[57] ABSTRACT

A method for producing inflated dunnage on the site of use, comprising providing, in rolled form, a plurality of preformed plastic bags, each of the bags comprising two plastic sheets in facing relationship and sealed along three edges with one edge remaining open. Air is blown toward each of the open edges in sequence, causing each bag to inflate, and the fourth edge of each inflated bag is sealed, the bag being empty except for the air. At least one sealed inflated bag is separated from the roll and placed in a carton to serve as dunnage. In an alternate embodiment, the stock material is provided in a continuous tubular form, and an air inflation needle is used to puncture a surface of the tube for inflation purposes.

9 Claims, 2 Drawing Sheets

FIG. 1
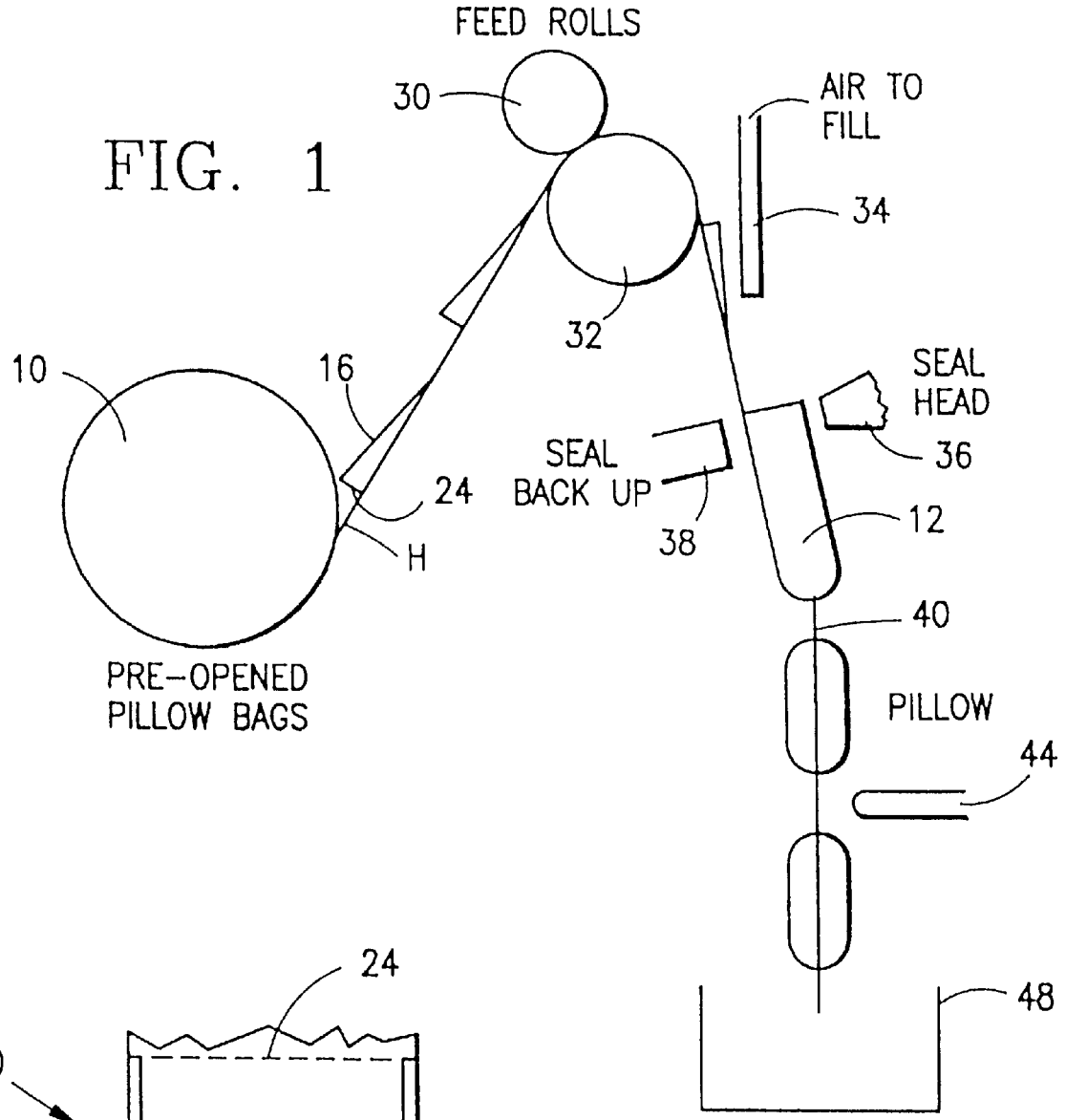
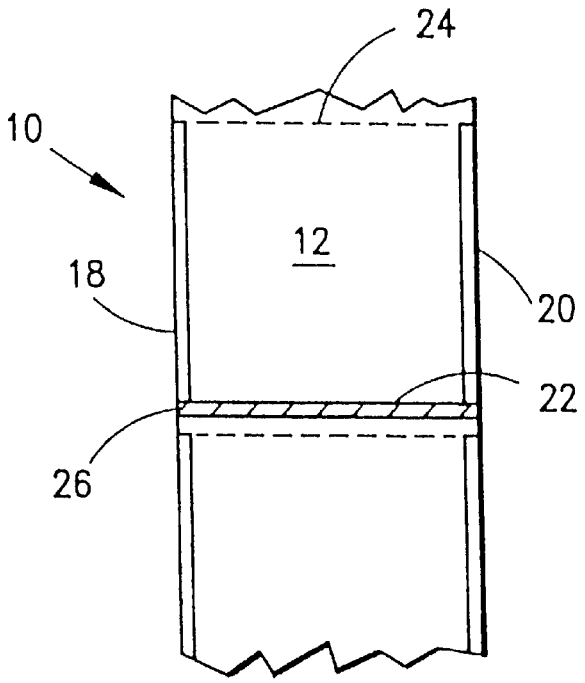
FIG. 2

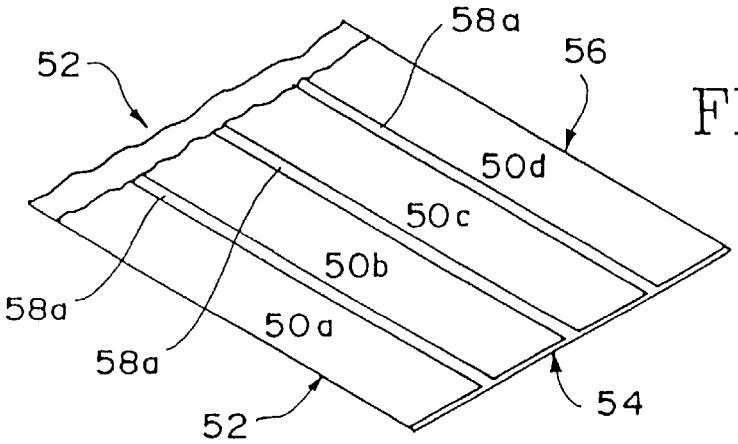
FIG. 3
FIG. 4
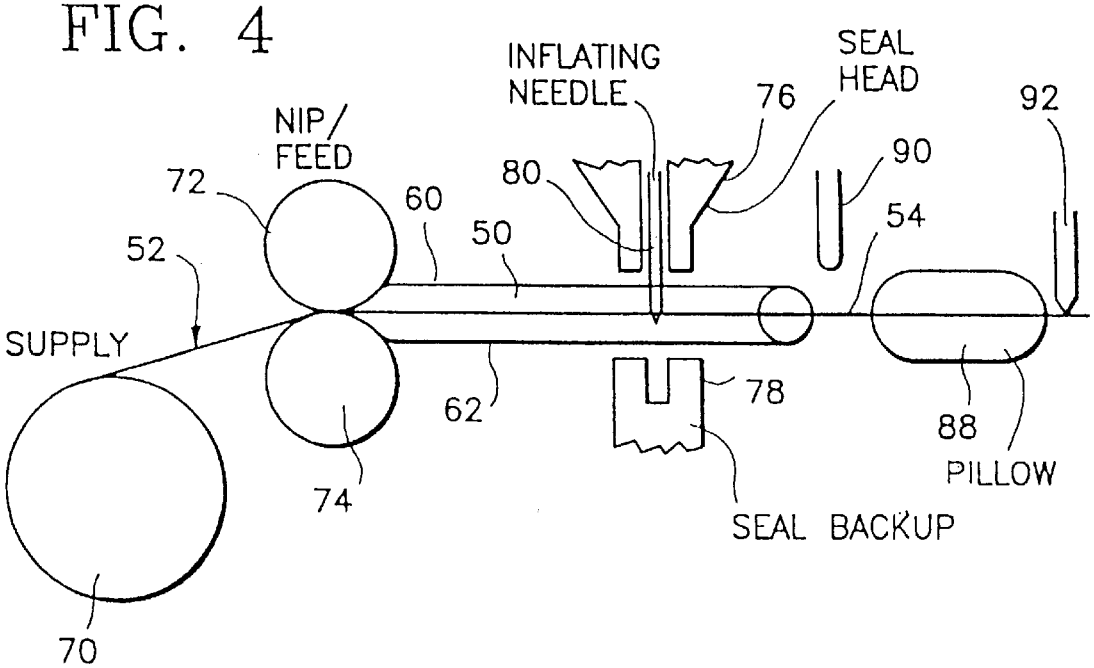
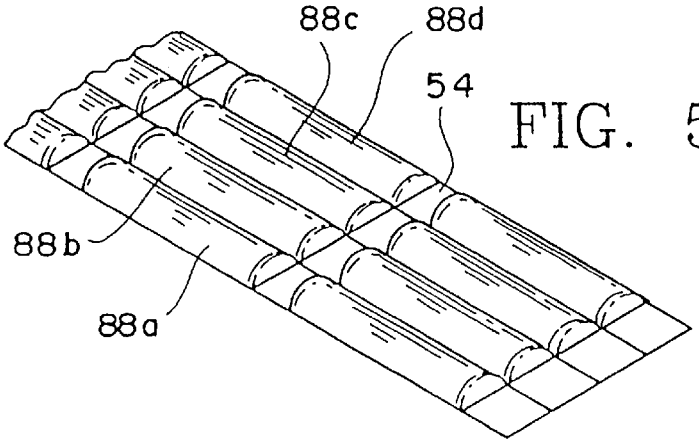
FIG. 5

METHOD FOR PRODUCING INFLATED DUNNAGE

Matter enclosed in heavy brackets [ ] appears in the original patent but forms no part of this reissue specification; matter printed in italics indicates the additions made by reissue.

*This application is a reissue of Ser. No. 08/317,760, filed on Oct. 4, 1994 now U.S. Pat. No. 5,552.003.*

BACKGROUND OF THE INVENTION

The invention relates to a process for producing dunnage directly on the site of use.

Materials with low density and high volume are commonly used as packing materials to insulate goods being shipped from shock. Among the materials used are polystyrene "peanuts," cups and "worms," pellets of foam rubber foam, plastics and expanded polyurethane foam. Air cushioning material is generally preferred over the above types of dunnage because it is lighter in weight, can be supplied and dispensed in a controlled manner, particularly in roll form, and applied to the product to be shipped in sheet form. The sheet form of material is also easier to dispose than the individual pieces of plastic dunnage after the product is removed, and the sheet form of material can be rewound for further use or disposed of by deflation.

However, air cushioning material also presents a variety of problems, as large volumes of the material must be kept on hand, and due to the necessity of shipping this material from the producer, shipping costs can be considerable.

In order to overcome these problems, devices have been proposed to produce sealed air dunnage on site from plastic sheets. U.S. Pat. Nos. 5,188,691, 5,203,761, and 4,576,669 all propose devices for producing air filled dunnage, typically bubble wrap, from plastic sheets on an "on demand" basis.

U.S. Pat. No. 3,575,757 discloses a process for producing dunnage on site from plastic sheets in which opposed sheets are bonded together in a U-shaped seal to form a pocket, the pocket is inflated and then sealed by the formation of a subsequent U-shaped seal.

However, the above methods of producing dunnage are somewhat disadvantageous, as the apparatus necessary to handle two separate sheets of plastic is somewhat complex and difficult to operate. When used on site, it is typically operated by people whose expertise is not in the production of dunnage and who have some difficulty operating the equipment at peak efficiency.

SUMMARY OF THE INVENTION

It is therefore an object of the invention to produce dunnage on site in a simplified manner.

It is a further object of the invention to provide dunnage on site by a method which can be operated easily by personnel without expertise in the production of dunnage.

To achieve these and other objects, the present invention provides a method for producing dunnage comprising the steps of providing, in roll form, a plurality of preformed plastic bags, each of said bags comprising two plastic sheets in facing relationship and sealed along three edges thereof with one edge remaining open, the bags being releasably attached in sequence along two opposed edges, blowing air toward each said open edge causing each said bag to inflate in sequence, sealing the fourth edge of each said inflated bag, the bag being empty except for air during the sealing operation, separating at least one sealed inflated bag from the roll of bags and placing the separated sealed bag in a carton to serve as dunnage.

Typically, a roll of bags will be provided which is segmented longitudinally, but a roll can also be provided which is segmented both longitudinally and laterally, to produce a roll with, for example, four bags across or eight bags across. The bags can be separated from the roll individually and placed in a carton, or can be separated in groups of at least two bags, and typically more. This is advantageous, as the dunnage which is produced can be wrapped around an object and taped together just as bubble wrap would be, and which is as easy to dispose of or reuse as bubble wrap. The inflated dunnage of the invention is, however, much easier to produce than bubble wrap.

In a particularly preferred embodiment of the invention, the external surface of the bags can be treated to impart greater tack, as compared with the inner surface. Increasing the tackiness of the surface of plastic bags in order to enable them to open more easily is known, for example, from U.S. Pat. No. 4,904,092, in which bags are coated with an adhesive. Alternatively, a tacky outer surface can be provided by coextruding two or more bag layers of differing tack. Increasing the tack of this outside surface of the bags is also desirable in that the bags will tend to interlock in use and prevent the packaged product from moving.

Various types and thicknesses of material can be used to make the bags of the invention. Among these materials are nylon film, high density polyethylene and low density polyethylene. Nylon film will keep air trapped for a long period of time, while high density polyethylene is strong and also holds air for a long period of time. Low density polyethylene tends to be inexpensive and will typically be used. The thickness of the films can be adjusted to provide extra strength or light weight, depending on which properties are desired.

It is also possible to produce the plastic film with degradable additives in order to aid in disposal.

Importantly, the apparatus used to inflate and seal plastic bags is well known and easy to operate. Typically, an air filled sealed bag will be used for packaging a small article. In this regard, U.S. Pat. Nos. 3,254,828, 3,298,156 and 3,477,196 are cited as representative patents showing methods and apparatus for blowing open bags on rolls, and U.S. Pat. No. 4,103,471 is cited to show an apparatus for packaging materials in a protective atmosphere, in which a foodstuff is packaged in a bag under an inert atmosphere and the bag is then sealed.

In an additional embodiment of the invention, the starting material is not a roll of plastic bags, but rather a stock material comprising two plastic sheets in facing relationship which are sealed together along the longitudinal outer edges, or a single sheet sealed into tubular form. This roll of stock material is unrolled and a first lateral seal is placed across the material. Unrolling is then continued, and an inflation needle punctures one of the plastic sheets. Air is blown through the needle, causing an inflated "pillow" to form at least between the needle and the seal. In carrying out this process, the inflated area actually extends back as far as the point which there is pressure keeping the facing plastic sheets from separating, either at the roll itself or at rollers assisting in the unrolling of the stock material.

After a pillow is formed, the needle is withdrawn from between the sheets, and substantially simultaneously, another lateral seal is formed across the area from which the needle was removed. Each seal thus forms an inflated pillow, and the seals can be cut at predetermined intervals to form pillow units to be placed in a carton as dunnage.

In a particularly preferred embodiment of the invention, the stock material has one or more centrally located longitudinal seals in addition to the edge seals. Multiple inflation needles will then be used, with one needle being needed to inflate a longitudinal section. The end result is multiple longitudinal pillow units.

BRIEF DESCRIPTION OF THE DRAWINGS

FIG. 1 is a schematic diagram of a first method for forming inflated dunnage;

FIG. 2 is a plan view of a roll of plastic bags used in the first method;

FIG. 3 is a plan view of a stock material used in a second method for preparing inflated dunnage;

FIG. 4 is a schematic view of a second method for producing inflated dunnage; and FIG. 5 is a plan view of the inflated dunnage prepared by the second method.

DESCRIPTION OF THE PREFERRED EMBODIMENTS

As shown in FIG. 1, the starting material of the process is a roll 10 of plastic bags, the roll comprising a backing sheet 14 and a facing sheet 16. The roll of bags is shown in detail in FIG. 2, each bag 12 formed from a first longitudinal seal 18, a second longitudinal seal 20 and a lateral seal 22. Edge 24 is not sealed. The roll of bags passes between feed rolls 30 and 32, the rolls creating enough tension to cause a slight opening in edge 24. Air tube 34 blows air at slightly opened edge 24, as the bag passes the tube, causing the bag 12 to inflate. The bag then passes between seal head 36 and seal backup 38, which places a lateral seal 40 across edge 24 of the bag. The bags then pass a separating station 44 which is activated at predetermined intervals to cut across lateral seal 40 and form an individual sealed bag, or a unit with multiple sealed bags.

The roll of bags 10 may be provided with lateral perforations 26 in order to simplify the separation of the sealed bags.

This method of forming the sealed bags is highly advantageous, as the relatively difficult job of sealing three edges of each bag is done beforehand on a central facility which specializes in the manufacture of plastic bags. The dunnage itself is formed on site in only the quantity necessary and is formed with equipment which need be capable of handling only a single roll, placing only a lateral seal across the roll and cutting.

In an alternate embodiment of the invention, shown in FIG. 3, the starting material is not a roll of bags, but a roll formed of a stock material 52 sealed along longitudinal edges 52 and 56. Lateral starting edge 54 may be sealed beforehand, or may be left open and sealed during the process. In addition to the seals of longitudinal edges 52 and 56, central longitudinal seals 58a, 58b, and 58c may optionally be placed in the material, thus creating pockets 50a, 50b, 50c and 50d.

Inflated dunnage is formed from this stock material as shown in FIG. 4. The stock material 52 is unrolled from a roll 70 between feed rolls 72 and 74. A seal head 76 and seal backup 78 are located downstream of the feed rolls, and a retractable inflation needle 80 is part of the seal head.

As noted, a starting lateral edge 54 of the feed material may be presealed, or it may be sealed in starting the process using seal heads 76 and seal backup 78. After the formation of that seal, the stock material continues to be unrolled, and at a predetermined point, inflation needle 80 is extended to puncture top sheet 60 of the stock material 52, but not puncture bottom sheet 62. Air is blown through the inflation needle, inflating pocket 50 between sealed edge 54 in the inflation needle, but in practice, the inflated area extends back as far as the feed rolls. In a substantially simultaneous manner, the needle is withdrawn, and seal head 76 and seal backup 78 interact to form a lateral seal across the stock material. Optionally, a perforation head 90 may be provided just after the seal head and backup to form perforations between the pillows as they are formed. The result is the formation of pillows 88, and cutting station 92 is located downstream of the sealing and inflation apparatus to cut across the lateral seals at predetermined intervals to form pillow units which can be placed in cartons.

When the stock material includes multiple longitudinal seals, the result is the pillow units shown in FIG. 5, including multiple longitudinal pillows 88a, 88b, 88c and 88d. The longitudinal pillow units are separated by a lateral seal 54. Normally, several lateral seals 54 will be left intact, to create a pillow unit including two or more longitudinally attached pillow units. A multiple pillow unit as described, including several lateral seals, is flexible both longitudinally and laterally, and can effectively be wrapped around a large object.

What is claimed is:

1. Method for producing dunnage, comprising the steps of:

a) coextruding two polymers of differing tack to form a plastic sheet having opposite surfaces of differing tack;

b) sealing said plastic sheet to another said plastic sheet so as to form a plurality of plastic bags, each of said bags comprising said plastic sheets in facing relationship and sealed along three edges thereof with one edge remaining open, said bags having inner and outer surfaces with said outer surfaces having greater tack than said inner surfaces, and said bags being releasably attached to each other along two opposed edges;

c) rolling up said plurality of plastic bags to form a plurality of bags in roll form;

d) providing said plurality of plastic bags in roll form at a site where said dunnage is to be produced;

e) unrolling said plurality of bags in roll form at said site, and blowing air towards each said open edge in sequence, causing each said bag to inflate;

f) sealing the fourth edge of each said inflated bag, said bag being empty except for air of inflation;

g) separating at least one said sealed bag from said plurality of bags in roll form; and h) placing a plurality of said separated, sealed bags in a carton to serve as *interlocked* dunnage.

2. Method according to claim 1, wherein the bags are releasably attached by segmenting the roll of bags longitudinally at predetermined intervals.

3. Method according to claim 2, wherein the roll of bags is segmented both longitudinally and laterally.

4. Method according to claim 1, wherein said bags are separated in groups of at least two bags to form dunnage units.

5. Method according to claim 1, wherein the fourth edge is sealed with heat.

*6. A method for producing dunnage comprising the steps of;*

*a) forming a multi-layered elongated web of interconnected bags from plastic film having outer surfaces of*

*greater tack than inner surfaces, the layers being interconnected such that each of the bas has a fill openings communicating with an otherwise perimetrically closed fill space;*

*b) transporting the web of interconnected bags to a site where dunnage is to be produced;*

*c) sequentially blowing air through the bag fill openings to fill the communicating fill spaces;*

*d) sealing each filled bag to close the fill opening of each such filled bag;*

*e) separating a selected number of filled bags from the web; and,*

*f) placing such separated bags as dunnage in interlocking relationships in a package being formed.*

*7. Method according to claim 6, wherein the bags are releasably attached by segmenting the web of bags laterally at predetermined intervals.*

*8. Method according to claim 7, wherein the web of bags is segmented both longitudinally and laterally.*

*9. Method according to claim 6, wherein said bags are separated in groups of at least two bags to form dunnage units.*

* * * * *